United States Patent
Xue et al.

(10) Patent No.: US 12,476,669 B2
(45) Date of Patent: Nov. 18, 2025

(54) WIRED COOPERATIVE MULTIPLE INPUT MULTIPLE OUTPUT (CMIMO) SIGNAL TRANSMISSION METHOD BASED ON THE MULTIMODE TRANSMISSION LINE

(71) Applicant: SOUTH CHINA UNIVERSITY OF TECHNOLOGY, Guangzhou (CN)

(72) Inventors: Quan Xue, Guangzhou (CN); Yue Li, Guangzhou (CN); Wenquan Che, Guangzhou (CN); Shaowei Liao, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/713,696

(22) PCT Filed: Mar. 28, 2022

(86) PCT No.: PCT/CN2022/083522
§ 371 (c)(1),
(2) Date: May 27, 2024

(87) PCT Pub. No.: WO2023/168767
PCT Pub. Date: Sep. 14, 2023

(65) Prior Publication Data
US 2025/0047323 A1    Feb. 6, 2025

(30) Foreign Application Priority Data
Mar. 10, 2022  (CN) .......................... 202210240962.9

(51) Int. Cl.
*H04B 3/52* (2006.01)
*H04B 3/46* (2015.01)

(52) U.S. Cl.
CPC ................. *H04B 3/52* (2013.01); *H04B 3/46* (2013.01)

(58) Field of Classification Search
CPC . H04B 3/52; H04B 3/46; H04B 3/466; H04B 3/462; H04B 3/48; H04B 3/487;
(Continued)

(56) References Cited

U.S. PATENT DOCUMENTS

| 9,525,467 B2 * | 12/2016 | Kim | H04B 7/0413 |
| 11,552,737 B1 * | 1/2023 | Shattil | H04L 1/0077 |

(Continued)

FOREIGN PATENT DOCUMENTS

| CN | 105009473 | 10/2015 |
| CN | 111628833 | 9/2020 |

OTHER PUBLICATIONS

Shiyan Pan et al., "Research on Performance of Adaptive Linear Dispersion Code Scheme", Video Engineering, Apr. 2, 2013, with English abstract, pp. 132-134, vol. 37, No. 7.
(Continued)

*Primary Examiner* — Khanh C Tran
(74) *Attorney, Agent, or Firm* — JCIPRNET (57) ABSTRACT

Disclosed is a wired cooperative multiple input multiple output (CMIMO) signal transmission method based on a multimode transmission line. The method includes the following step: selecting a type of the multimode transmission line; constructing a wired CMIMO transmission system based on the multimode transmission line; performing channel measurement to obtain a transmission coefficient matrix; judging whether the transmission coefficient matrix satisfies a full rank and reversibility and has a condition number satisfying conditions; optimizing a structure of the multimode transmission line, a multiport excitation structure, and a multiport receiving structure to obtain the transmission coefficient matrix which satisfies a full rank and reversibility and has a condition number satisfying conditions; making the transmission coefficient matrix be equivalent to a chan-
(Continued)

nel matrix of the wired CMIMO transmission system; and completing signal excitation, transmission and reception of the wired CMIMO transmission system based on the multimode transmission line.

20 Claims, 3 Drawing Sheets

(58) Field of Classification Search
CPC .......... H04B 3/493; H04B 3/50; H04B 10/00; H04B 10/40; H04B 10/572; H04B 10/501; H04B 10/516
See application file for complete search history.

(56) References Cited

U.S. PATENT DOCUMENTS

| | | |
|---|---|---|
| 2010/0157925 A1 | 6/2010 | Francos |
| 2015/0244433 A1* | 8/2015 | Jindal ................... H04B 7/0689 375/267 |
| 2016/0219578 A1* | 7/2016 | Lim ....................... H04B 7/026 |

OTHER PUBLICATIONS

Futurewei, "Sounding enhancement for interference probing in TDD cooperative MIMO", 3GPP TSG RAN WG1 #102 e, e Meeting, R1 2005291, Aug. 17-28, 2020, pp. 1-9.

Utpal Dey et al., "Millimeter-wave Chip-to-Chip Interconnect Using Plastic Wire Operating in Single and Dual Mode", 2018 IEEE/MTT-S International Microwave Symposium, Jun. 10-15, 2018, pp. 1549-1552.

Vladimir S. Lyubopytov et al. "Modeling and Optimization of Vortex Modes Propagation in Rectangular Dielectric Waveguides", IEEE Photonics Journal, Feb. 2020, vol. 12, No. 1.

Diep N. Nguyen et al., "Cooperative MIMO in Wireless Networks: Recent Developments and Challenges", IEEE Network, Jul./Aug. 2013, pp. 48-54.

A. E. Willner et al., "Optical communications using orbital angular momentum beams", Advances in Optics and Photonics, Mar. 2015, pp. 66-106.

Peng Wu et al., "Wideband Excitations of Higher-Order Mode Substrate Integrated Waveguides and Their Applications to Antenna Array Design", IEEE Transactions on Antennas and Propagation, Aug. 2017, pp. 4038-4047, vol. 65, No. 8.

"International Search Report (Form PCT/ISA/210) of PCT/CN2022/083522", mailed on Nov. 29, 2022, with English translation thereof, pp. 1-4.

* cited by examiner

WIRED COOPERATIVE MULTIPLE INPUT MULTIPLE OUTPUT (CMIMO) SIGNAL TRANSMISSION METHOD BASED ON THE MULTIMODE TRANSMISSION LINE

TECHNICAL FIELD

The present invention relates to the technical field of signal transmission in the communication field, and particularly relates to a wired cooperative multiple input multiple output (CMIMO) signal transmission method based on the multimode transmission line.

BACKGROUND

In recent years, with increasingly high demands on the rate and capacity of wired transmission in actual application scenarios such as the Ethernet, in-rack equipment (including switches and routers) interconnection, and inter-board interconnection a wired transmission technology has received extensive attention in the industrial circle and the academic circle. The wired transmission technology is applied to constructing various transmission systems, is widely applied to microwave frequency bands and terahertz frequency bands, and is of great significance. Conventional transmission line interconnection often uses a fundamental mode for single mode transmission or orthogonal degenerate mode transmission, so that the achieved channel capacity is limited.

An interconnection system using a waveguide or an optical fiber as the transmission line can improve the channel capacity by adopting mode division multiplexing such as multiplexing of a plurality of eigenmodes and orbital angular momentum (OAM) mode multiplexing (U. Dey and J. Hesselbarth, "Millimeter-wave Chip-to-Chip Interconnect Using Plastic Wire Operating in Single and Dual Mode," in IEEE/MTT-S International Microwave Symposium, Philadelphia, PA, USA, 2018, pp. 1549-1552. V. S. Lyubopytov, R. V. Kutluyarov, V. K. Bagmanov, N. Neumann, and A. K. Sultanov, "Modeling and Optimization of Vortex Modes Propagation in Rectangular Dielectric Waveguides," IEEE Photonics Journal, vol. 12, no. 1, pp. 1-17, 2020.). For a single transmission line, it is highly complicated to design an excitation structure capable of generating the plurality of eigenmodes (particularly high-order modes) simultaneously. In addition, there is a problem of mode coupling in a transmission process by adopting the OAM mode multiplexing, resulting in a reduced channel capacity.

The multiple input multiple output (MIMO) technology is a method for effectively expanding the capacity by means of spatial multiplexing in wireless communication. The CMIMO is a cooperative communication technology based on MIMO, which can effectively improve the channel capacity and has the advantages of high energy utilization ratio, low delay, and the like, but has the problems of cooperative jamming, frequent signaling exchange, and the like in wireless communication applications (D. N. Nguyen and M. Krunz, "Cooperative MIMO in wireless networks: recent developments and challenges," IEEE Network, vol. 27, no. 4, pp. 48-54, 2013.).

There are the following specific defects in the prior art:

1. Mode division multiplexing is mainly applied to wired communication. It is difficult to generate a plurality of high-order modes simultaneously by the single transmission line. In the transmission process, there exists mode coupling, resulting in the reduced channel capacity (A. E. Willner et al., "Optical communications using orbital angular momentum beams," Advances in Optics and Photonics, vol. 7, no. 1, pp. 66-106, 2015. P. Wu, S. Liao, and Q. Xue, "Wideband Excitations of Higher-Order Mode Substrate Integrated Waveguides and Their Applications to Antenna Array Design," IEEE Transactions on Antennas and Propagation, vol. 65, no. 8, pp. 4038-4047, 2017.).

2. The CMIMO technology is mainly applied to wireless communication and has the problem that the channel environment is time-variant, resulting in cooperative jamming, frequent signaling exchange, and large amount of computation (D. N. Nguyen and M. Krunz, "Cooperative MIMO in wireless networks: recent developments and challenges," IEEE Network, vol. 27, no. 4, pp. 48-54, 2013.).

SUMMARY

To improve the channel capacity of a single wired physical channel (a waveguide or other waveguide structures which support multi-eigenmode transmission) and avoid the problem of mode coupling caused by eigenmode multiplexing, the present invention provides a wired cooperative multiple input multiple output (CMIMO) signal transmission method based on a multimode transmission line.

In the present invention, CMIMO is expanded to the wired communication field. In combination with a plurality of eigenmodes of the multimode transmission line, a multipath effect is provided. The present invention provides a method for improving the channel capacity of a wired interconnection system. By exciting enough eigenmodes by a multiport excitation structure designed based on a multimode transmission line and regarding the eigenmodes as the multiple paths, the present invention provides a channel matrix with full rank, reversibility, and good condition number through design and optimization of structures (including the excitation structure, the multimode transmission line, and a receiving structure). In addition, multipath signals generated by sending signals to the multiport excitation structure by a plurality of transmitters can be viewed as signals of a plurality of cooperative work nodes in the CMIMO. The multimode transmission line can provide a stable channel environment, thereby effectively avoiding frequent signaling exchange in the wireless CMIMO. Therefore, the present invention provides the multipath effect and uses conditions of the CMIMO through the plurality of eigenmodes of the multimode transmission line, thereby effectively improving the channel capacity of a wired transmission system.

An object of the present invention is at least realized by one of the technical solutions as follows:

A wired cooperative multiple input multiple output (CMIMO) signal transmission method based on a multimode transmission line, including the following steps:

S1: selecting a type of the multimode transmission line;

S2: for exciting a plurality of eigenmodes of the multimode transmission line and achieving good transmission and reception, designing a structure of the multimode transmission line, a multiport excitation structure, and a multiport receiving structure based on the selected type of the multimode transmission line to construct a wired CMIMO transmission system based on the multimode transmission line;

S3: performing channel measurement on an entirety formed by the multiport excitation structure, the multimode transmission line, and the multiport receiving structure to obtain a transmission coefficient matrix;

S4: judging whether the transmission coefficient matrix satisfies a full rank and reversibility, and has a condition number satisfying conditions; if not, executing S5; and if yes, executing S6;

S5: optimizing the structure of the multimode transmission line, the multiport excitation structure, and the multiport receiving structure to obtain a transmission coefficient matrix such that the transmission coefficient matrix satisfies the full rank and reversibility and has the condition number satisfying conditions;

S6: making the transmission coefficient matrix provided by the entirety formed by the multiport excitation structure, the multimode transmission line, and the multiport receiving structure equivalent to a channel matrix of the wired CMIMO transmission system; and S7: completing signal excitation, transmission, and reception of the wired CMIMO transmission system based on the multimode transmission line based on the obtained channel matrix and a theory of a wired CMIMO signal transmission method based on the multimode transmission line.

Further, in S2, the wired CMIMO transmission system based on the multimode transmission line includes a transmitter, the multiport excitation structure, the multimode transmission line, the multiport receiving structure, and a receiver;

where an original signal is sent into the multimode transmission line via the multiport excitation structure through the transmitter, the multimode transmission line can excite a plurality of transmittable eigenmodes, and the original signal is transmitted in the multimode transmission line in the form of multiple paths formed by the plurality of eigenmodes, is received by the multiport receiving structure, and is outputted to the receiver.

Further, in S3, the original signal inputted into the multiport excitation structure is $\vec{x}$, a signal after being received by the multiport receiving structure is $\vec{y}$, and system noise is $\vec{n}$, specifically as follows:

$$\vec{x} = (x_1, x_2, x_3, \ldots, x_M)^T$$
$$\vec{y} = (y_1, y_2, y_3, \ldots, y_M)^T$$
$$\vec{n} = (n_1, n_2, n_3, \ldots, n_M)^T$$

numbers of ports of the multiport excitation structure and the multiport receiving structure both are M; $x_i$ represents a signal transmitted by the $i^{th}$ port of the multiport excitation structure of the transmitter, i=1, 2, 3, ..., M; $y_j$ represents a signal received by the $j^{th}$ port of the multiport receiving structure of the receiver, j=1, 2, 3, ..., M; and $n_j$ represents a system noise signal corresponding to the $j^{th}$ port of the multiport receiving structure of the receiver; and as a medium of the transmission system, both ends of the multimode transmission line are respectively the multiport excitation structure and the multiport receiving structure, and the channel measurement is performed to obtain the transmission coefficient matrix $\vec{H}$, specifically as follows:

$$\vec{H} = \begin{bmatrix} S_{11} & S_{21} & \ldots & S_{M1} \\ S_{12} & S_{22} & \ldots & S_{M2} \\ \vdots & \vdots & \ddots & \vdots \\ S_{1M} & S_{2M} & \ldots & S_{MM} \end{bmatrix}$$

where $S_{ji}$ represents transmission coefficients from the $i^{th}$ port of the multiport excitation structure to the $j^{th}$ port of the multiport receiving structure.

Further, in S4, the transmission coefficient matrix $\vec{H}$ needs to satisfy the full rank and reversibility and have the condition number satisfying the conditions, and S4 includes the following specific steps:

judging whether a rank of the transmission coefficient matrix is equal to an order of the transmission coefficient matrix;

judging whether a determinant of the transmission coefficient matrix is not zero;

setting a threshold n, and judging whether the condition number of the transmission coefficient matrix is within (1,1+n), where n is obtained in an experiment; and solving the condition number of the transmission coefficient matrix $\vec{H}$ according to an equation cond($\vec{H}$)= $\|\vec{H}\|\|\vec{H}^{-1}\|$, where the condition number is an important index to measure a fault-tolerant ability of digital computation of the transmission coefficient matrix $\vec{H}$, and the less the condition number is, the smaller the error caused by the digital computation.

Further, in S5, optimizing the structure of the multimode transmission line, the multiport excitation structure, and the multiport receiving structure includes optimizing the structure and size of the multimode transmission line or optimizing port structures, port shapes, sizes, and topologies of the multiport excitation structure and the multiport receiving structure.

Further, in S6, the transmission matrix provided by the entirety formed by the multiport excitation structure, the multimode transmission line, and the multiport receiving structure is made equivalent to the channel matrix, marked as $\vec{H}_T$:

$$\vec{H}_T = \vec{H}$$

$\vec{H}_T$ is assumed as:

$$\vec{H}_T = \begin{bmatrix} h_{11} & h_{21} & \ldots & h_{M1} \\ h_{12} & h_{22} & \ldots & h_{M2} \\ \vdots & \vdots & \ddots & \vdots \\ h_{1M} & h_{2M} & \ldots & h_{MM} \end{bmatrix}$$

$h_{ji}$ in the matrix $\vec{H}_T$ represents the transmission coefficients from the $i^{th}$ port of the multiport excitation structure to the $j^{th}$ port of the multiport receiving structure, satisfying $h_{ji}=S_{ji}$, i=1, 2, 3, ..., M, j=1, 2, 3, ..., M, and the matrix $\vec{H}_T$ needs to satisfy the condition of full rank and reversibility;

therefore, a received signal $\vec{y}$ is represented as:

$$\vec{y} = \vec{H}_T \vec{x} + \vec{n} \tag{1}$$

and the equation (1) is expanded to obtain:

$$\begin{bmatrix} y_1 \\ y_2 \\ \vdots \\ y_M \end{bmatrix} = \begin{bmatrix} h_{11} & h_{21} & \ldots & h_{M1} \\ h_{12} & h_{22} & \ldots & h_{M2} \\ \vdots & \vdots & \ddots & \vdots \\ h_{1M} & h_{2M} & \ldots & h_{MM} \end{bmatrix} \begin{bmatrix} x_1 \\ x_2 \\ \vdots \\ x_M \end{bmatrix} + \begin{bmatrix} n_1 \\ n_2 \\ \vdots \\ n_M \end{bmatrix}. \tag{2}$$

Further, in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T})^{-1}\vec{n}$ and $\vec{H_e}=(\vec{H_T})^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, $j=1, 2, 3, \ldots, M$, and $e_{ab}$ represents an element of $\vec{H_e}=(\vec{H_T}+)^{-1}\vec{H_T}$ obtained by digital calculation, $a=1, 2, 3, \ldots, M$, $b=1, 2, 3, \ldots, M$; as a result of the finiteness of the digital computation, there is a certain error between the obtained value of the element and a theoretical value;
the equation (3) can be simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \ldots + e_{Mj}x_M + n_j' \quad (5)$$

where $j=1, 2, 3, \ldots, M$;
therefore, a signal-to-noise ratio $SINR_j$ of the signal $x_j'$ recovered from the signal received by the $j^{th}$ port of the multiport receiving structure is:

$$SINR_j = \frac{(\|e_{jj}\|^2)}{\|e_{1j}\|^2 + \|e_{2j}\|^2 + \ldots + \|e_{(j-1)j}\|^2 + \|e_{(j+1)j}\|^2 + \ldots + \|e_{Mj}\|^2 + \|n_j'\|^2} \quad (6)$$

in a similar way, signal-to-noise ratios of signals recovered from other receiving ports can be solved; and assuming that a working bandwidth is B, a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

Further, in S1, the type of multimode transmission line selected is mainly determined by the practical application requirements, the multimode transmission line is a waveguide structure capable of supporting transmission of the plurality of eigenmodes, including a metal waveguide or a dielectric waveguide.

Further, in S2, designing the structure of the multimode transmission line, the multiport excitation structure, and the multiport receiving structure includes designing the structure and size of the multimode transmission line or designing port structures, port shapes, sizes and topologies of the multiport excitation structure and the multiport receiving structure such that the plurality of transmittable eigenmodes can be excited in the multimode transmission line and that coupling and transmission effect of good signals is achieved.

Compared with the prior art, the present invention has the following advantages:

1. By expanding the CMIMO to the field of wired communication, channel conditions are provided thereto by taking a plurality of eigenmodes as multiple paths, wherein the plurality of eigenmodes can be supported by a single multimode transmission line and can be transmitted well;

2. The stable channel environment of the multimode transmission line can greatly reduce the amount of computation of CMIMO, and a CMIMO decoder can improve the energy utilization ratio and the signal-to-noise ratio of signals, so that the channel capacity is improved;

3. The multiport excitation structure in the single multimode transmission line in the present invention has lower requirements and a simpler design than that of the excitation structure directly adopting multi-eigenmode multiplexing; and 4. The present invention effectively avoids the problem of mode coupling in mode multiplexing and is suitable for all the multimode transmission lines capable of supporting multi-eigenmode transmission.

DESCRIPTION OF THE EMBODIMENTS

In order to make the objects, technical solutions, and advantages of the present invention clearer, a specific implementation of the present invention will be further described below in combination with drawings and embodiments.

Embodiment 1

Figure 1:
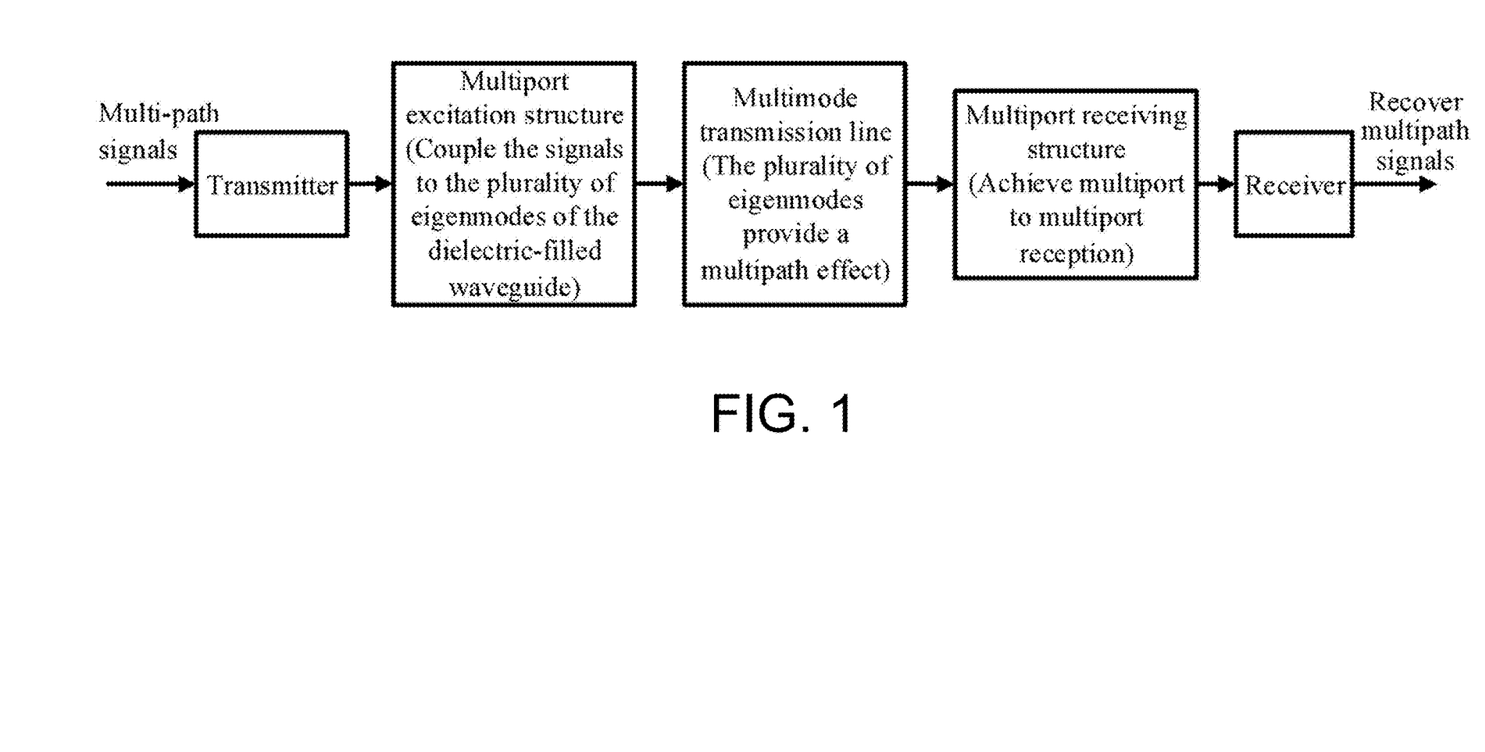
FIG. 1 is a structural schematic diagram of a wired cooperative multiple input multiple output (CMIMO) transmission system based on a multimode transmission line in an embodiment of the present invention.
Figure 2:
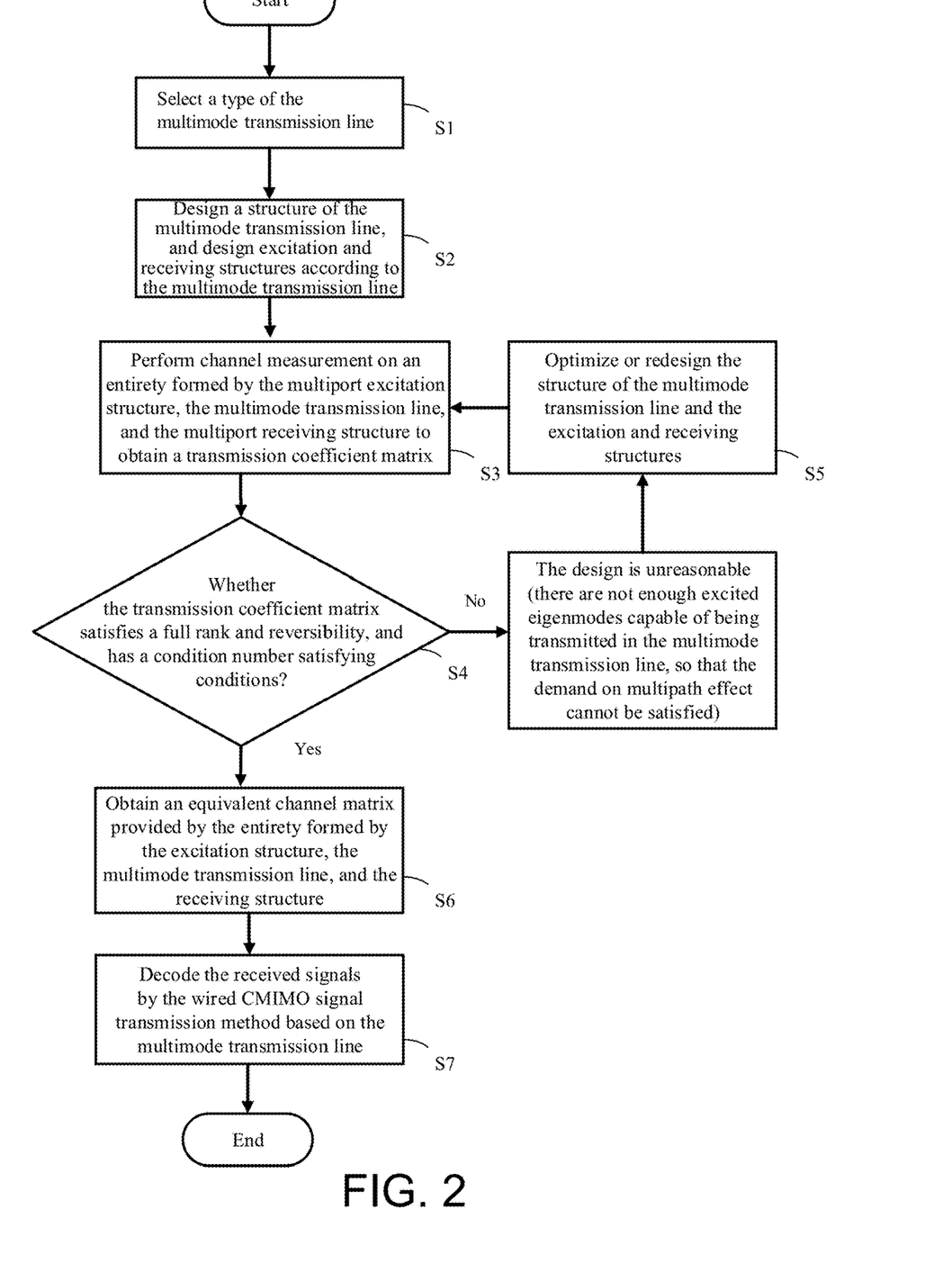
FIG. 2 is a flowchart of the CMIMO signal transmission method based on a multimode transmission line in the embodiment of the present invention.
Figure 3:
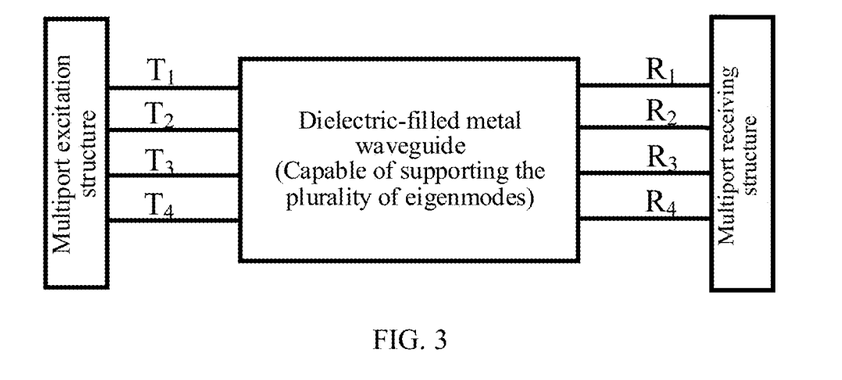
FIG. 3 is a schematic diagram of a 4×4 wired CMIMO transmission system model based on a dielectric-filled metal waveguide in embodiment 1 of the present invention.

A wired cooperative multiple input multiple output (CMIMO) signal transmission method based on a multimode transmission line, as shown in FIG. 2, including the following steps:

S1: a type of the multimode transmission line is selected; in the embodiment, by taking a short-distance inter-board interconnection transmission scenario as an example, the dielectric-filled metal waveguide is used as a multipath signal of the multimode transmission line;

S2: based on the selected dielectric-filled metal waveguide, to excite the plurality of eigenmodes of the dielectric-filled metal waveguide and achieve good transmission and reception, a structure of the dielectric-filled metal waveguide, a multiport excitation structure, and a multiport receiving structure is designed to construct a wired CMIMO transmission system based on the dielectric-filled metal waveguide capable of supporting multimode transmission;

as shown in FIG. 1, the wired CMIMO transmission system based on the dielectric-filled metal waveguide capable of supporting multimode transmission includes a transmitter, the multiport excitation structure, the dielectric-filled metal waveguide, the multiport receiving structure, and a receiver;

in the embodiment, four-path original signals are emitted, transmitted, and received, i.e., M=4, as shown in FIG. 3, and the multiport excitation structure and the multiport receiving structure in the embodiment include a plurality of slot structures; the four-path original signals are sent to the dielectric-filled waveguide of multimode transmission through ports $T_1$-$T_4$ of the multiport excitation structure by the transmitter and are transmitted in the dielectric-filled waveguide in the form of multipath formed by the plurality of eigenmodes, and after the multiport receiving structure corresponding to the ports $R_1$-$R_4$ receives the signals, the channel matrix obtained according to channel measurement are reversely solved to recover the original signals;

S3: channel measurement is performed on an entirety formed by the multiport excitation structure, the dielectric-filled metal waveguide, and the multiport receiving structure to obtain a transmission coefficient matrix;

the original signal inputted into the multiport excitation structure is $\vec{x}$, a signal after being received by the multiport receiving structure is $\vec{y}$, and system noise is $\vec{n}$, specifically as follows:

$$\vec{x}=(x_1,x_2,x_3,\ldots,x_M)^T$$

$$\vec{y}=(y_1,y_2,y_3,\ldots,y_M)^T$$

$$\vec{n}=(n_1,n_2,n_3,\ldots,n_M)^T$$

numbers of ports of the multiport excitation structure and the multiport receiving structure both are M; $x_i$ represents a signal transmitted by the $i^{th}$ port of the multiport excitation structure of the transmitter, i=1, 2, 3, ..., M; $y_j$ represents a signal received by the $j^{th}$ port of the multiport receiving structure of the receiver, j=1, 2, 3, ..., M; and $n_j$ represents a system noise signal corresponding to the $j^{th}$ port of the multiport receiving structure of the receiver; and as a medium of the transmission system, both ends of the dielectric-filled metal waveguide supporting multimode transmission are respectively the multiport excitation structure and the multiport receiving structure, and the channel measurement is performed to obtain the transmission coefficient matrix $\vec{H}$, specifically as follows:

$$\vec{H} = \begin{bmatrix} S_{11} & S_{21} & \ldots & S_{M1} \\ S_{12} & S_{22} & \ldots & S_{M2} \\ \vdots & \vdots & \ddots & \vdots \\ S_{1M} & S_{2M} & \ldots & S_{MM} \end{bmatrix}$$

where $S_{ji}$ represents transmission coefficients from the $i^{th}$ port of the multiport excitation structure to the $j^{th}$ port of the multiport receiving structure;

S4: whether the transmission coefficient matrix satisfies a full rank and reversibility and has the condition number satisfying the conditions is judged; if not, S5 is executed; and if yes, S6 is executed;

the transmission coefficient matrix $\vec{H}$ needs to satisfy a full rank and reversibility, and has a condition number satisfying conditions, and S4 includes the following specific steps:

whether a rank of the transmission coefficient matrix is equal to an order of the transmission coefficient matrix is judged;

whether a determinant of the transmission coefficient matrix is not zero is judged;

a threshold n is set, and whether the condition number of the transmission coefficient matrix is within (1,1+n) is judged; in the embodiment, as the application scenario here is short-distance transmission, to guarantee the transmission effect, n=0.8 is taken;

the condition number of the transmission coefficient matrix $\vec{H}$ is solved according to an equation $\text{cond}(\vec{H})=\|\vec{H}\|\|\vec{H}^{-1}\|$, where the condition number is an important index to measure a fault-tolerant ability of digital computation of the transmission coefficient matrix $\vec{H}$, and the less the condition number is, the smaller the error caused by the digital computation is;

S5: in the embodiment, the cross-section structure of the dielectric-filled waveguide is optimized, and the sizes and the topological structures of the plurality of slot structures in the multiport excitation structure and the multiport receiving structure are optimized to obtain a new transmission coefficient matrix, such that the transmission coefficient matrix satisfies the full rank and reversibility and has the condition number satisfying conditions;

S6: the transmission coefficient matrix provided by the entirety formed by the multiport excitation structure, the dielectric-filled metal waveguide, and the multiport receiving structure is made equivalent to a channel matrix of the wired CMIMO transmission system; and the transmission matrix provided by the entirety formed by the multiport excitation structure, the dielectric-filled metal waveguide, and the multiport receiving structure is made equivalent to the channel matrix, marked as $\vec{H}_T$:

$$\vec{H}_T = \vec{H}$$

$\vec{H}_T$ is assumed as:

$$\vec{H}_T = \begin{bmatrix} h_{11} & h_{21} & \ldots & h_{M1} \\ h_{12} & h_{22} & \ldots & h_{M2} \\ \vdots & \vdots & \ddots & \vdots \\ h_{1M} & h_{2M} & \ldots & h_{MM} \end{bmatrix}$$

$h_{ji}$ in the matrix $\vec{H_T}$ represents the transmission coefficients from the $i^{th}$ port of the multiport excitation structure to the $j^{th}$ port of the multiport receiving structure, satisfying $h_{ji}=S_{ji}$, i=1, 2, 3, . . . , M, j=1, 2, 3, . . . , M, and the matrix $\vec{H_T}$ needs to satisfy the condition of full rank and reversibility;

therefore, a received signal y is represented as:

$$\vec{y} = \vec{H}_T \vec{x} + \vec{n} \quad (1)$$

and the equation (1) is expanded to obtain:

$$\begin{bmatrix} y_1 \\ y_2 \\ \vdots \\ y_M \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix} \begin{bmatrix} x_1 \\ x_2 \\ \vdots \\ x_M \end{bmatrix} + \begin{bmatrix} n_1 \\ n_2 \\ \vdots \\ n_M \end{bmatrix}. \quad (2)$$

S7: signal excitation, transmission, and reception of the wired CMIMO transmission system based on the multimode transmission line is completed based on the obtained channel matrix and a theory of the wired CMIMO signal transmission method based on the multimode transmission line;

joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T}+)^{-1}\vec{n}$ and $\vec{H_e}=(\vec{H_T}+)^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, j=1, 2, 3, . . . , M; and $e_{ab}$ represents an element of $\vec{H_e}=(\vec{H_T}+)^{-1}\vec{H_T}$ obtained by digital calculation, a=1, 2, 3, . . . , M, b=1, 2, 3, . . . , M, as a result of the finiteness of the digital computation, there is a certain error between the obtained value of the element and a theoretical value;

the equation (3) can be simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \ldots + e_{Mj}x_M + n_j' \quad (5)$$

where j=1, 2, 3, . . . , M;

therefore, a signal-to-noise ratio $SINR_j$ of the signal $x_j'$ recovered from the signal received by the $j^{th}$ port of the multiport receiving structure is:

$$SINR_j = \frac{(\|e_{jj}\|^2)}{\|e_{1j}\|^2 + \|e_{2j}\|^2 + \ldots + \|e_{(j-1)j}\|^2 + \|e_{(j+1)j}\|^2 + \ldots + \|e_{Mj}\|^2 + \|n_j'\|^2} \quad (6)$$

in a similar way, signal-to-noise ratios of signals recovered from other receiving ports can be solved; and assuming that a working bandwidth is B, then a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

Embodiment 2

Figure 4:
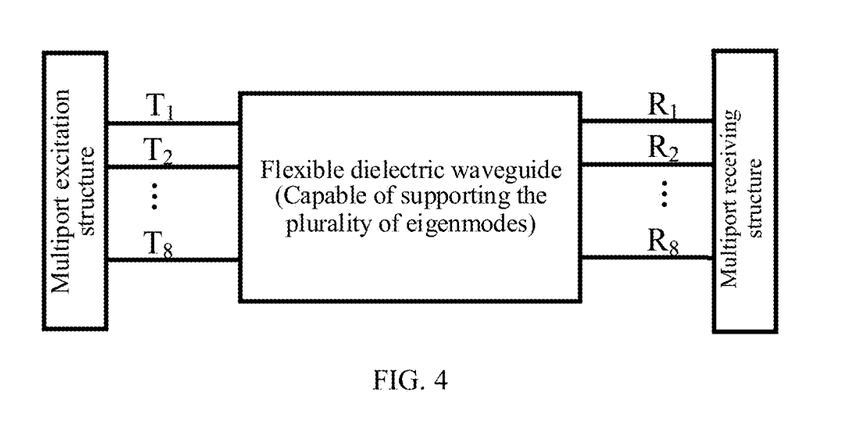
FIG. 4 is a schematic diagram of an 8×8 wired CMIMO transmission system model based on a flexible dielectric waveguide in embodiment 2 of the present invention.

The differences between the embodiment and the embodiment 1 are as follows:

in S1, by taking a transmission scenario of switches of a data center as an example, the transmission line needs to have a flexible characteristic. A flexible dielectric waveguide is selected and used as the multimode transmission line to transmit multipath signals;

in S2, the port structures formed by eight waveguides are divided into the excitation structure and the receiving structure to emit, transmit, and receive the eight-path original signals, i.e., M=8, as shown in FIG. 4; the eight-path original signals are sent to the flexible dielectric waveguide of multimode transmission through ports $T_1$-$T_8$ of the multiport excitation structure by the transmitter and are transmitted in the flexible dielectric waveguide in the form of multipath formed by the plurality of eigenmodes, and after the multiport receiving structure corresponding to the ports $R_1$-$R_8$ receives the signals, the channel matrix obtained according to channel measurement are reversely solved to restore the original signals;

in S4, n=0.5; and in S5, the shape and size of the cross-section of the dielectric waveguide are optimized, and the shapes, sizes and topological structures of the plurality of waveguide in the multiport excitation structure and the multiport receiving structure are optimized to obtain a new transmission coefficient matrix such that the transmission coefficient matrix satisfies the full rank and reversibility, and has the condition number satisfying conditions;

Embodiment 3

Figure 5:
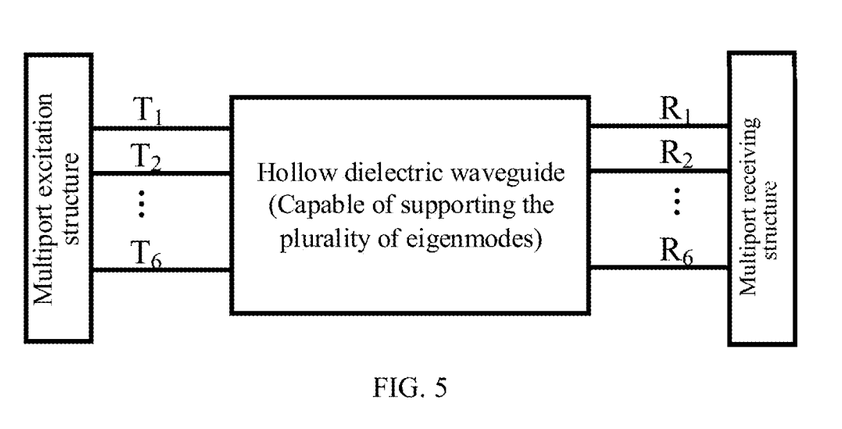
FIG. 5 is a schematic diagram of an 8×8 wired CMIMO transmission system model based on a hollow dielectric waveguide in embodiment 3 of the present invention.

The differences between the present embodiment and the embodiment 1 are as follows:

in S1, by taking an intra-board scenario with low-loss transmission as an example, a low-loss hollow dielectric waveguide is selected and used as the multimode transmission line to transmit multipath signals;

in S2, the multiport excitation structure and the receiving structure are prepared from six microstrips to emit, transmit, and receive the six-path original signals, i.e., M=6, as shown in FIG. 5; the six-path original signals are sent to the hollow dielectric waveguide of multimode transmission through ports $T_1$-$T_6$ of the multiport excitation structure by the transmitter and are transmitted in the hollow dielectric waveguide in the form of multipath formed by the plurality of eigenmodes, and after the multiport receiving structure corresponding to the ports $R_1$-$R_6$ receives the signals, the channel matrix obtained according to channel measurement are reversely solved to restore the original signals;

in S4, n=2;

in S5, the size of the hollow dielectric waveguide is optimized, and the sizes and the topological structures of the microstrips in the multiport excitation structure and the multiport receiving structure are optimized to obtain a new transmission coefficient matrix, such that the transmission coefficient matrix satisfies the full rank and reversibility, and has the condition number satisfying conditions.

What is claimed is:

1. A wired cooperative multiple input multiple output (CMIMO) signal transmission method based on a multimode transmission line, comprising following steps:

S1: selecting a type of the multimode transmission line;

S2: designing a structure of the multimode transmission line, a multiport excitation structure, and a multiport receiving structure based on a selected type of the multimode transmission line to construct a wired CMIMO transmission system based on the multimode transmission line;

S3: performing channel measurement on an entirety formed by the multiport excitation structure, the multimode transmission line, and the multiport receiving structure to obtain a transmission coefficient matrix;

S4: judging whether the transmission coefficient matrix satisfies a full rank and reversibility, and has a condition number satisfying conditions; if not, executing S5; and if yes, executing S6;

S5: optimizing the structure of the multimode transmission line, the multiport excitation structure, and the multiport receiving structure to obtain the transmission coefficient matrix which satisfies the full rank and reversibility and has the condition number satisfying conditions;

S6: making the transmission coefficient matrix provided by the entirety formed by the multiport excitation structure, the multimode transmission line, and the multiport receiving structure equivalent to a channel matrix of the wired CMIMO transmission system; and S7: completing signal excitation, transmission, and reception of the wired CMIMO transmission system based on the multimode transmission line based on the channel matrix and a theory of a wired CMIMO signal transmission method based on the multimode transmission line.

2. The wired CMIMO signal transmission method based on the multimode transmission line according to claim 1, wherein in S2, the wired CMIMO transmission system based on the multimode transmission line comprises a transmitter, the multiport excitation structure, the multimode transmission line, the multiport receiving structure, and a receiver;

wherein an original signal is sent into the multimode transmission line via the multiport excitation structure through the transmitter, the multimode transmission line excites a plurality of eigenmodes which are transmittable, and the original signal is transmitted in the multimode transmission line in form of multiple paths formed by the plurality of eigenmodes, is received by the multiport receiving structure, and is outputted to the receiver.

3. The wired CMIMO signal transmission method based on the multimode transmission line according to claim 2, wherein in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T})^{-1}\vec{n}$ and $\vec{H_e}=(\vec{H_T})^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \ldots & h_{M1} \\ h_{12} & h_{22} & \ldots & h_{M1} \\ \vdots & \vdots & \ddots & \vdots \\ h_{1M} & h_{2M} & \ldots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \ldots & e_{M1} \\ e_{12} & e_{22} & \ldots & e_{M1} \\ \vdots & \vdots & \ddots & \vdots \\ e_{1M} & e_{2M} & \ldots & e_{MM} \end{bmatrix}$$

where $x_j'$ represents a signal recovered from a signal received by a $j^{th}$ port of the multiport receiving structure; $n_j'$ represents equivalent system noise obtained by inversely solving the $j^{th}$ port of the multiport receiving structure, $j=1, 2, 3, \ldots, M$; and $e_{ab}$ represents an element of $\vec{H_e}=(\vec{H_T})^{-1}\vec{H_T}$ obtained by digital calculation, $a=1, 2, 3, \ldots, M$, $b=1, 2, 3, \ldots, M$;

the equation (3) is simplified as:

$$\begin{bmatrix} x_1' \\ x_2' \\ \vdots \\ x_M' \end{bmatrix} = \begin{bmatrix} e_{11} & e_{21} & \ldots & e_{M1} \\ e_{12} & e_{22} & \ldots & e_{M1} \\ \vdots & \vdots & \ddots & \vdots \\ e_{1M} & e_{2M} & \ldots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \ldots + e_{Mj}x_M + n_j' \quad (5)$$

where $j=1, 2, 3, \ldots, M$;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \ldots + \|e_{(j-1)j}\|^2 + \|e_{(j+1)j}\|^2 + \ldots + \|e_{Mj}\|^2 + \|n_j'\|^2} \quad (6)$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

4. The wired CMIMO signal transmission method based on the multimode transmission line according to claim 3, wherein in S1, the multimode transmission line is a waveguide structure capable of supporting transmission of the plurality of eigenmode, comprising a metal waveguide or a dielectric waveguide.

5. The wired CMIMO signal transmission method based on the multimode transmission line according to claim 3, wherein in S2, designing the structure of the multimode transmission line, the multiport excitation structure, and the multiport receiving structure comprises designing the structure and size of the multimode transmission line or designing port structures, port shapes, sizes and topologies of the multiport excitation structure and the multiport receiving structure, such that the plurality of eigenmodes is excited in the multimode transmission line.

6. The wired CMIMO signal transmission method based on the multimode transmission line according to claim 2, wherein in S3, the original signal inputted into the multiport excitation structure is $\vec{x}$, a signal after being received by the multiport receiving structure is $\vec{y}$, and system noise is $\vec{n}$, specifically as follows:

$$\vec{x} = (x_1, x_2, x_3, \ldots, x_M)^T$$

$$\vec{y} = (y_1, y_2, y_3, \ldots, y_M)^T$$

$$\vec{n} = (n_1, n_2, n_3, \ldots, n_M)^T$$

numbers of ports of the multiport excitation structure and the multiport receiving structure both are M; $x_i$ represents a signal transmitted by the $i^{th}$ port of the multiport excitation structure of the transmitter, i=1, 2, 3, ..., M; $y_j$ represents a signal received by the $j^{th}$ port of the multiport receiving structure of the receiver, j=1, 2, 3, ..., M; and $n_j$ represents a system noise signal corresponding to the $j^{th}$ port of the multiport receiving structure of the receiver; and as a medium of the transmission system, both ends of the multimode transmission line are respectively the multiport excitation structure and the multiport receiving structure, and the channel measurement is performed to obtain the transmission coefficient matrix $\vec{H}$, specifically as follows:

$$\vec{H} = \begin{bmatrix} S_{11} & S_{21} & \cdots & S_{M1} \\ S_{12} & S_{22} & \cdots & S_{M2} \\ \vdots & \vdots & \ddots & \vdots \\ S_{1M} & S_{2M} & \cdots & S_{MM} \end{bmatrix}$$

where $S_{ji}$ represents transmission coefficients from the $i^{th}$ port of the multiport excitation structure to the $j^{th}$ port of the multiport receiving structure.

7. The wired CMIMO signal transmission method based on the multimode transmission line according to claim 6, wherein in S7, joint decoding is performed based on CMIMO; a signal recovered by solving a signal received by the receiver is marked as $\vec{x}' = (x_1', x_2', \ldots, x_M')^T$, and meanwhile, $\vec{n}' = (n_1', n_2', \ldots, n_M')^T = (\vec{H_T})^{-1} \vec{n}$ and $\vec{H_e} = (\vec{H_T})^{-1} \vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M1} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1} \vec{H_T} = \begin{bmatrix} e_{11} & e_{21} & \cdots & e_{M1} \\ e_{12} & e_{22} & \cdots & e_{M1} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, j=1, 2, 3, ..., M; and $e_{ab}$ represents an element of $\vec{H_e} = (\vec{H_T})^{-1} \vec{H_T}$ obtained by digital calculation, a=1, 2, 3, ..., M, b=1, 2, 3, ..., M;

the equation (3) is simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M1} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j} x_1 + e_{2j} x_2 + \ldots + e_{Mj} x_M + n_j' \quad (5)$$

where j=1, 2, 3, ..., M;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \ldots + \|e_{(j-1)j}\|^2 + \|e_{(j+1)j}\|^2 + \ldots + \|e_{Mj}\|^2 + \|n_j'\|^2} \quad (6)$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

8. The wired CMIMO signal transmission method based on the multimode transmission line according to claim 7, wherein in S1, the multimode transmission line is a waveguide structure capable of supporting transmission of the plurality of eigenmode, comprising a metal waveguide or a dielectric waveguide.

9. The wired CMIMO signal transmission method based on the multimode transmission line according to claim 7, wherein in S2, designing the structure of the multimode transmission line, the multiport excitation structure, and the multiport receiving structure comprises designing the structure and size of the multimode transmission line or design ing port structures, port shapes, sizes and topologies of the multiport excitation structure and the multiport receiving structure, such that the plurality of eigenmodes is excited in the multimode transmission line.

10. The wired CMIMO signal transmission method based on the multimode transmission line according to claim 6, wherein in S4, the transmission coefficient matrix $\vec{H}$ satisfies the full rank and reversibility and has the condition number satisfying the conditions, and S4 comprises following specific steps:

judging whether a rank of the transmission coefficient matrix is equal to an order of the transmission coefficient matrix;

judging whether a determinant of the transmission coefficient matrix is not zero; and setting a threshold n, and judging whether the condition number of the transmission coefficient matrix is within (1,1+n), wherein n is obtained in an experiment.

11. The wired CMIMO signal transmission method based on the multimode transmission line according to claim 10, wherein the condition number of the transmission coefficient matrix $\vec{H}$ is solved according to an equation $\operatorname{cond}(\vec{H})=\|\vec{H}\|\|\hat{H}^{-1}\|$.

12. The wired CMIMO signal transmission method based on the multimode transmission line according to claim 11, wherein in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T})^{-1}\vec{n}$ and $\vec{H_e}=(\vec{H_T})^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} H_e = (H_T)^{-1}H_T = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \quad (3)$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, $j=1, 2, 3, \ldots, M$; and $e_{ab}$ represents an element of $\vec{H_e}=(\vec{H_T})^{-1}\vec{H_T}$ obtained by digital calculation, $a=1, 2, 3, \ldots, M$, $b=1, 2, 3, \ldots, M$;

the equation (3) is simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \cdots + e_{Mj}x_M + n_j' \quad (5)$$

where $j=1, 2, 3, \ldots, M$;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \cdots + \|e_{(j-1)j}\|^2 + \|e_{(j+1)j}\|^2 + \cdots + \|e_{Mj}\|^2 + \|n_j'\|^2} \quad (6)$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

13. The wired CMIMO signal transmission method based on the multimode transmission line according to claim 12, wherein in S1, the multimode transmission line is a waveguide structure capable of supporting transmission of the plurality of eigenmode, comprising a metal waveguide or a dielectric waveguide.

14. The wired CMIMO signal transmission method based on the multimode transmission line according to claim 10, wherein in S5, optimizing the structure of the multimode transmission line, the multiport excitation structure, and the multiport receiving structure comprises optimizing the structure and size of the multimode transmission line or optimizing port structures, port shapes, sizes and topologies of the multiport excitation structure and the multiport receiving structure.

15. The wired CMIMO signal transmission method based on the multimode transmission line according to claim 14, wherein in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T})^{-1}\vec{n}$ and $\vec{H_e}=(\vec{H_T})^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, $j=1, 2, 3, \ldots, M$; and $e_{ab}$ represents an element of $\vec{H_e} = (\vec{H_T})^{-1}\vec{H_T}$ obtained by digital calculation, $a=1, 2, 3, \ldots, M, b=1, 2, 3, \ldots, M$;

the equation (3) is simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \cdots + e_{Mj}x_M + n_j' \quad (5)$$

where $j=1, 2, 3, \ldots, M$;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \cdots + \|e_{(j-1)j}\|^2 + \|e_{(j+1)j}\|^2 + \cdots + \|e_{Mj}\|^2 + \|n_j'\|^2}$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\prod_{j=1}^{M}(1+SINR_j)}. \quad (7)$$

16. The wired CMIMO signal transmission method based on the multimode transmission line according to claim 10, wherein in S6, the transmission coefficient matrix provided by the entirety formed by the multiport excitation structure, the multimode transmission line, and the multiport receiving structure is made equivalent to the channel matrix, marked as $\vec{H_T}$:

$$\vec{H_T} = \vec{H}$$

$\vec{H_T}$ is assumed as:

$$\vec{H_T} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}$$

$h_{ji}$ in the channel matrix $\vec{H_T}$ represents the transmission coefficients from the $i^{th}$ port of the multiport excitation structure to the $j^{th}$ port of the multiport receiving structure, satisfying $h_{ji}=S_{ji}$, $i=1, 2, 3, \ldots, M$, $j=1, 2, 3, \ldots, M$, and the channel matrix $\vec{H_T}$ satisfies the full rank and reversibility;

a received signal $\vec{y}$ is represented as:

$$\vec{y} = \vec{H_T}\vec{x} + \vec{n} \quad (1)$$

and the equation (1) is expanded to obtain:

$$\begin{bmatrix} y_1 \\ y_2 \\ \vdots \\ y_M \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix} \begin{bmatrix} x_1 \\ x_2 \\ \vdots \\ x_M \end{bmatrix} + \begin{bmatrix} n_1 \\ n_2 \\ \vdots \\ n_M \end{bmatrix}. \quad (2)$$

17. The wired CMIMO signal transmission method based on the multimode transmission line according to claim 16, wherein in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, n_M')^T=(\vec{H_T})^{-1}\vec{n}$ and $\vec{H_e}=(\vec{H_T})^{-1}\vec{H_T}$ are marked; at this time:

(6)

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M2} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, $j=1, 2, 3, \ldots, M$; and $e_{ab}$ represents an element of $\vec{H_e}=(\vec{H_T})^{-1}\vec{H_T}$ obtained by digital calculation, $a=1, 2, 3, \ldots, M, b=1, 2, 3, \ldots, M$;

the equation (3) is simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M2} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \cdots + e_{Mj}x_M + n_j' \quad (5)$$

where $j=1, 2, 3, \ldots, M$;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \cdots + \|e_{(j-1)j}\|^2 + \|e_{(j+1)j}\|^2 + \cdots + \|e_{Mj}\|^2 + \|n_j'\|^2} \quad (6)$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\Pi_{j=1}^{M}(1+SINR_j)}. \quad (7)$$

18. The wired CMIMO signal transmission method based on the multimode transmission line according to claim 10, wherein in S7, joint decoding is performed based on CMIMO; a signal recovered by solving a signal received by the receiver is marked as $\vec{x}'=(x_1', x_2', \ldots, x_M')^T$, and meanwhile, $\vec{n}'=(n_1', n_2', \ldots, x_M')^T=(\vec{H_T})^{-1}\vec{n}$ and $\vec{H_e}=(\vec{H_T})^{-1}\vec{H_T}$ are marked; at this time:

$$\begin{bmatrix} x_1' \\ x_2' \\ \vdots \\ x_M' \end{bmatrix} = \begin{bmatrix} h_{11} & h_{21} & \cdots & h_{M1} \\ h_{12} & h_{22} & \cdots & h_{M1} \\ \vdots & \vdots & \ddots & \vdots \\ h_{1M} & h_{2M} & \cdots & h_{MM} \end{bmatrix}^{-1} \begin{bmatrix} y_1 \\ y_2 \\ \vdots \\ y_M \end{bmatrix} \quad (3)$$

$$\vec{H_e} = (\vec{H_T})^{-1}\vec{H_T} = \begin{bmatrix} e_{11} & e_{21} & \cdots & e_{M1} \\ e_{12} & e_{22} & \cdots & e_{M1} \\ \vdots & \vdots & \ddots & \vdots \\ e_{1M} & e_{2M} & \cdots & e_{MM} \end{bmatrix}$$

where $x_j'$ represents a signal recovered from the signal received by the $j^{th}$ port of the multiport receiving structure; $n_j'$ represents equivalent system noise obtained by inversely solving the $j^{th}$ port of the multiport receiving structure, $j=1, 2, 3, \ldots, M$; and $e_{ab}$ represents an element of $\vec{H_e}=(\vec{H_T})^{-1}\vec{H_T}$ obtained by digital calculation, $a=1, 2, 3, \ldots, M$, $b=1, 2, 3, \ldots, M$;

the equation (3) is simplified as:

$$\begin{bmatrix} x_1' \\ x_2' \\ \vdots \\ x_M' \end{bmatrix} = \begin{bmatrix} e_{11} & e_{21} & \cdots & e_{M1} \\ e_{12} & e_{22} & \cdots & e_{M1} \\ \vdots & \vdots & \ddots & \vdots \\ e_{1M} & e_{2M} & \cdots & e_{MM} \end{bmatrix} \begin{bmatrix} x_1 \\ x_2 \\ \vdots \\ x_M \end{bmatrix} + \begin{bmatrix} n_1' \\ n_2' \\ \vdots \\ n_M' \end{bmatrix} \quad (4)$$

for the signal $x_j'$ recovered from the signal received by the $j^{th}$ port of the multiport receiving structure, $$x_j' = e_{1j}x_1 + e_{2j}x_2 + \ldots + e_{Mj}x_M + n_j' \quad (5)$$

where $j=1, 2, 3, \ldots, M$;

a signal-to-noise ratio $SINR_j$ of the signal $x_j'$ recovered from the signal received by the $j^{th}$ port of the multiport receiving structure is:

$$SINR_j = \frac{\|e_{jj}\|^2}{\|e_{1j}\|^2 + \|e_{2j}\|^2 + \ldots + \|e_{(j-1)j}\|^2 + \|e_{(j+1)j}\|^2 + \ldots + \|e_{Mj}\|^2 + \|n_j'\|^2} \quad (6)$$

signal-to-noise ratios of signals recovered from other receiving ports is solved; and assuming that a working bandwidth is B, a channel capacity C of the whole transmission system is:

$$C = \sum_{j=1}^{j=M} B \cdot \log 2^{(1+SINR_j)} = B \cdot \log 2^{\Pi_{j=1}^{M}(1+SINR_j)}. \quad (7)$$

19. The wired CMIMO signal transmission method based on the multimode transmission line according to claim 18, wherein in S1, the multimode transmission line is a waveguide structure capable of supporting transmission of the plurality of eigenmode, comprising a metal waveguide or a dielectric waveguide.

20. The wired CMIMO signal transmission method based on the multimode transmission line according to claim 18 wherein in S2, designing the structure of the multimode transmission line, the multiport excitation structure, and the multiport receiving structure comprises designing the structure and size of the multimode transmission line or designing port structures, port shapes, sizes and topologies of the multiport excitation structure and the multiport receiving structure, such that the plurality of eigenmodes is excited in the multimode transmission line.

* * * * *